US009637625B2

(12) United States Patent
Nanba et al.

(10) Patent No.: US 9,637,625 B2
(45) Date of Patent: May 2, 2017

(54) GOLF BALL MATERIAL AND GOLF BALL

(71) Applicant: Bridgestone Sports Co., Ltd., Tokyo (JP)

(72) Inventors: Atsushi Nanba, Chichibushi (JP); Takanori Tago, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 14/714,877

(22) Filed: May 18, 2015

(65) Prior Publication Data

US 2015/0368452 A1 Dec. 24, 2015

(30) Foreign Application Priority Data

Jun. 24, 2014 (JP) ................................ 2014-129071

(51) Int. Cl.
| A63B 37/00 | (2006.01) |
| A63B 37/12 | (2006.01) |
| C08L 23/08 | (2006.01) |
| C08L 23/06 | (2006.01) |
| C08L 67/00 | (2006.01) |
| C08L 23/00 | (2006.01) |
| C08L 67/02 | (2006.01) |

(52) U.S. Cl.
CPC .......... *C08L 23/00* (2013.01); *A63B 37/0024* (2013.01); *A63B 37/0051* (2013.01); *A63B 37/0075* (2013.01); *A63B 37/0076* (2013.01); *C08L 23/06* (2013.01); *C08L 23/0869* (2013.01); *C08L 23/0876* (2013.01); *C08L 67/02* (2013.01); *C08L 67/025* (2013.01); C08L 2205/03 (2013.01); C08L 2205/08 (2013.01)

(58) Field of Classification Search
CPC ............ C08L 2205/08; C08L 23/0876; C08L 23/0869

See application file for complete search history.

(56) References Cited

U.S. PATENT DOCUMENTS

| 5,889,114 A * | 3/1999 | Statz ....................... C08L 23/08 525/166 |
| 6,268,437 B1 * | 7/2001 | Takesue ............. A63B 37/0003 473/365 |
| 6,274,669 B1 * | 8/2001 | Rajagopalan ...... A63B 37/0084 473/365 |
| 2009/0264591 A1 * | 10/2009 | Sano ....................... C08L 23/02 525/93 |

FOREIGN PATENT DOCUMENTS

| GB | 2278364 A | 11/1994 |
| JP | 60-80469 A | 5/1985 |
| JP | 60-145160 A | 7/1985 |
| JP | 64-32878 A | 2/1989 |
| JP | 4-126168 A | 4/1992 |
| JP | 6-327794 A | 11/1994 |
| JP | 11-276638 A | 10/1999 |

* cited by examiner

*Primary Examiner* — David Buttner
(74) *Attorney, Agent, or Firm* — Sughrue Mion, PLLC

(57) ABSTRACT

A golf ball material includes (A) one, two or more resin ingredients selected from among olefin-unsaturated carboxylic acid random copolymers, olefin-unsaturated carboxylic acid-unsaturated carboxylic acid ester random copolymers, and metal ion neutralization products of these copolymers, (B) one two or more resin ingredients selected from among polyethylenes, ethylene-vinyl acetate copolymers and polyesters, and (C) the specific agent for compatibilizing components (A) and (B).

5 Claims, No Drawings

GOLF BALL MATERIAL AND GOLF BALL

CROSS-REFERENCE TO RELATED APPLICATION

This non-provisional application claims priority under 35 U.S.C. §119(a) on Patent Application No. 2014-129071 filed in Japan on Jun. 24, 2014, the entire contents of which are hereby incorporated by reference.

BACKGROUND OF THE INVENTION

Field of the Invention

The present invention relates to a golf ball material, and more particularly to a golf ball material that can be suitably used as the material forming a part of the core and/or cover of a golf ball composed of a core of one or more layer and a cover of one or more layer.

Prior Art

Ionomer resins have hitherto been widely used as the cover material in golf balls. However, owing to the constant desire by users for golf balls endowed with a high rebound and a high durability, a variety of improvements are being carried out on such ionomer-based resins. In addition, innovations that entail mixing a low-cost resin such as polyethylene or ethylene-vinyl acetate copolymer (EVA) with an ionomer-based resin material have also been proposed in order to reduce costs.

One example is a golf ball that uses as the cover material an ionomer blend obtained by mixing a small amount of a medium- or low-density polyethylene with an ionomer-based resin (JP-A 60-145160). In addition, JP-A 60-80469, JP-A 1-32878, JP-A 4-126168 and JP-A 6-327794 describe, as golf ball materials, compositions which are obtained by blending an ethylene-vinyl acetate copolymer (EVA) with an ionomer-based resin. However, in all of these golf ball materials, the compatibility between the ionomer and these various types of polyolefins is poor, which has presented a problem in terms of the durability of the golf ball.

JP-A 11-276638 discloses that, by introducing a graft copolymer in which some or all of an ethylene copolymer has been graft-modified with an unsaturated dicarboxylic anhydride, the compatibility between the ionomer and the ethylene copolymer is improved, enhancing the durability of golf ball covers formed of such polymer compositions. However, a sufficient durability has not been achieved.

In addition, because the durability markedly declines when a low-cost resin such as polyethylene or ethylene-vinyl acetate copolymer (EVA) is mixed with an ionomer resin, art that improves the durability by adding and kneading an organic peroxide into this polymer alloy has been proposed. However, carrying out such a kneading operation takes time and effort. Moreover, in terms of the golf ball manufacturing operations, in cases where a compatibilizing agent is to be added to a polymer composition of an ionomer with a polyethylene, the polymer composition must first be subjected to a compounding step in an extruder, which takes a good deal of time and effort.

It is therefore an object of the invention to provide a golf ball composition composed primarily of an ionomer resin, which composition improves the ease and convenience of the golf ball manufacturing operations and enhances the durability of the resulting golf balls.

SUMMARY OF THE INVENTION

We have discovered that by adding, to a composition containing
(A) one, two or more resin ingredients selected from the group consisting of olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers and metal ion neutralization products of olefin-unsaturated carboxylic acid-unsaturated carboxylic acid ester random copolymers, and
(B) one, two or more resin ingredients selected from the group consisting of polyethylenes, ethylene-vinyl acetate copolymers and polyesters, a compatibilizing agent containing
   (C-i) two different types of base polymers selected from the series of groups in components (A) and (B) above,
   (C-ii) a hydrogenated diene polymer having at least one type of functional moiety selected from the group consisting of carboxyl, acid anhydride, (meth)acryloyl, amino, alkoxysilyl, hydroxyl, isocyanate and oxazoline moieties, and
   (C-iii) an olefinic polymer having at least one type of functional moiety selected from the group consisting of carboxyl, acid anhydride, epoxy, (meth)acryloyl, amino, alkoxysilyl, hydroxyl, isocyanate and oxazoline moieties, there is no need for a compounding step in a mixer such as an extruder, Banbury mixer or kneader, and that, after injection-molding or film insert-molding a dry blend of pellets alone, compatibilization is achieved and sufficient durability can be obtained.

Accordingly, in a first aspect, the invention provides a golf ball material containing: (A) one, two or more resin ingredients selected from the group consisting of olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers and metal ion neutralization products of olefin-unsaturated carboxylic acid-unsaturated carboxylic acid ester random copolymers; (B) one, two or more resin ingredients selected from the group consisting of polyethylenes, ethylene-vinyl acetate copolymers and polyesters; and (C) an agent for compatibilizing components (A) and (B). The compatibilizing agent (C) includes: (C-i) two different types of base polymers selected from the series of groups in components (A) and (B); (C-ii) a hydrogenated diene polymer having at least one type of functional moiety selected from the group consisting of carboxyl, acid anhydride, (meth)acryloyl, amino, alkoxysilyl, hydroxyl, isocyanate and oxazoline moieties; and (C-iii) an olefinic polymer having at least one type of functional moiety selected from the group consisting of carboxyl, acid anhydride, epoxy, (meth)acryloyl, amino, alkoxysilyl, hydroxyl, isocyanate and oxazoline moieties.

In a preferred embodiment of the golf ball material of the invention, components (A) and (B) are included in a weight ratio therebetween of from 95:5 to 5:95.

In another preferred embodiment of the inventive golf ball material, the content of component (C) is from 2 to 15 parts by weight per 100 parts by weight of the combined amount of components (A) and (B).

In yet another preferred embodiment, the base polymers in component (C-i) are each made up of a combination of a polyethylene and a polyester. The polyester is typically polyethylene terephthalate.

In a second aspect, the invention provides a golf ball having a core of one or more layer and a cover of one or more layer, wherein at least one member of the core and/or the cover is made of the golf ball material according to the first aspect of the invention.

The golf ball material of the invention helps simplify the golf ball manufacturing operations, and makes it possible to provide golf balls of markedly improved durability.

DETAILED DESCRIPTION OF THE INVENTION

The objects, features and advantages of the invention will become more apparent from the following detailed description.

The golf ball material of the invention is a material which includes above components (A) to (C). The material uses, as component (A), one, two or more resin ingredients selected from the group consisting of olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers and metal ion neutralization products of olefin-unsaturated carboxylic acid-unsaturated carboxylic acid ester random copolymers.

The olefin used in component (A) preferably has from 2 to 6 carbons; ethylene is especially preferred. The unsaturated carboxylic acid used in component A preferably has from 3 to 8 carbons; for example, acrylic acid, methacrylic acid or the like may be used. The unsaturated carboxylic acid ester used in component (A), although not particularly limited, is preferably a lower alkyl ester. Butyl acrylate (n-butyl acrylate, i-butyl acrylate) is especially preferred.

The content of unsaturated carboxylic acid (acid content) in component (A), although not particularly limited, is preferably at least 2 wt % but not more than 20 wt %, and more preferably at least 4 wt % but not more than 15 wt %. At an acid content lower than this range, moldings of the golf ball material may not achieve the desired resilience. On the other hand, if the acid content is too high, the hardness may become extremely high, which may adversely affect the durability.

In component (A), an olefin-unsaturated carboxylic acid random copolymer or an olefin-unsaturated carboxylic acid-unsaturated carboxylic acid ester random copolymer (un-neutralized form) may be used together with a metal ion neutralization product of an olefin-unsaturated carboxylic acid random copolymer or a metal ion neutralization product of an olefin-unsaturated carboxylic acid-unsaturated carboxylic acid ester random copolymer. In this case, the mixing proportions of the un-neutralized forms (I) of the copolymers and the metal neutralization products (II) of the copolymers are set to preferably (I):(II)=10:90 to 90:10, and more preferably 30:70 to 70:30 (parts by weight). If the proportion of the metal neutralization products is higher than the above range, the hardness may be excessive and the material may be difficult to mold.

In cases where metal neutralization products (ionomers) of the above copolymers are used as component (A), the type of metal neutralization product and its degree of neutralization are not subject to any particular limitation. Specific examples include 60 mol % Zn (degree of neutralization with zinc) ethylene-methacrylic acid copolymers, 40 mol % Mg (degree of neutralization with magnesium) ethylene-methacrylic acid copolymers, and 40 mol % Mg (degree of neutralization with magnesium) ethylene-methacrylic acid-isobutylene acrylate terpolymers.

Illustrative examples of commercial products that may be used as component (A) include the Nucrel series (DuPont-Mitsui Polychemicals Co., Ltd.), the Himilan series (Du-Pont-Mitsui Polychemicals Co., Ltd.), the Surlyn series and HPF series (E.I. DuPont de Nemours & Co.), and the Escor series (ExxonMobil Chemical).

Next, the golf ball material of the invention uses, as component (B), one, two or more resin ingredients selected from the group consisting of polyethylenes, ethylene-vinyl acetate copolymers and polyesters.

When a polyethylene is used as component (B), the polyethylene may be of any type. Illustrative examples include low-density polyethylenes polymerized by a high-pressure process, and high-density polyethylenes polymerized by a medium- or low-pressure process. The specific gravity of the low-density polyethylene is typically from 0.90 to 0.94, and the specific gravity of the high-density polyethylene is typically from 0.95 to 0.97.

As used herein, "high-pressure process" refers to a process that involves adding a very small amount of air to purified ethylene under an applied pressure of 600 to 1,000 atmospheres and heating at about 200° C. to effect polymerization. "Medium-pressure process" refers to a process that entails applying a pressure of about 20 to 30 atmospheres to ethylene and, using a catalyst such as chromium, heating at about 150° C. to effect polymerization. "Low-pressure process" refers to a process in which polymerization is carried out using a catalyst of titanium tetrachloride and triethylaluminum and at a pressure of from normal pressure to about 5 atmospheres and a temperature of from normal temperature to 70° C.

In the case of polyethylenes produced by a high-pressure process, because the ethylene monomer is forcibly fed into the reactor at high temperature and pressure during polymerization, branching side chains arise here and there. Crystallization of the polyethylene is hindered by these side chains, and so the polyethylene exhibits a low hardness.

On the other hand, in the case of polyethylenes produced by a medium- or low-pressure process, because a catalyst is added to the ethylene monomer and polymerization is carried out at a low pressure, a polyethylene with little branching is obtained. Accordingly, because polyethylene polymerized by a medium- or low-pressure process has little branching, the molecules gather together tightly in an orderly arrangement, resulting in a high rigidity.

Because low-density polyethylenes and high-density polyethylenes thus have different hardnesses and densities, it is possible to add to the ionomer resin a polyethylene that is suitable for the desired hardness and density of the cover material.

It is desirable for the polyethylene used in this invention to have a Shore D hardness of not more than 65, preferably not more than 64, and even more preferably not more than 61. At a polyethylene hardness higher than 65, the feel of the ball at impact may worsen, in addition to which the controllability may decrease owing to a decline in the spin rate. There is no particular lower limit in the Shore D hardness, although this is preferably set to at least 40.

Examples of low-density polyethylenes that may be used in this invention include the low-density polyethylenes available under the trade names Petrothene 219, Petrothene 339, Petrothene 340 and Petrothene 342 from Tosoh Corporation, products of the "Sanwax" series from Sanyo Chemical Industries, Ltd., and UBE Polyethylene 31019 from Ube-Maruzen Polyethylene Co., Ltd. High-density polyethylenes that may be used in the invention include those generally marketed as impact-resistant grades, examples of which are the high-density polyethylenes M6800 and M3800 available from Keiyo Polyethylene Co., Ltd.

In cases where an ethylene-vinyl acetate copolymer is used as component (B), illustrative examples of the ethylene-vinyl acetate copolymer include those available from Tosoh Corporation under the trade names Ultrathene 530, Ultrathene 539, Ultrathene 541, Ultrathene 537, Ultrathene 515, Ultrathene 540, Ultrathene 640, Ultrathene 07B53A and Ultrathene 710.

In cases where a polyester is used as component (B), illustrative examples of the polyester include polyester elastomers and the following polycondensation products of a polycarboxylic acid (dicarboxylic acid) with a polyol (diol): polyethylene terephthalate, polytrimethylene terephthalate, polybutylene terephthalate, polyethylene naphthalate and polybutylene naphthalate. Illustrative examples of polyester elastomers include the Hytrel series (3046, G3548L, 4047, 4767, 5557, 6347, 7247, 2571, 2751) from DuPont-Toray Co., Ltd., the Pelprene series (P-30B, P-40B, P-40H, P-55B, P-70B, P-90B, P-150B, P-280B, E-450B, P-75M, P-150M, S-1001, 5-2001, 5-3001, S-6001, S-9001) from Toyobo Co., Ltd., and the Primalloy series (A1400, A1500, A1600, A1700, A1800, A1900) from Mitsubishi Chemical Corporation.

Components (A) and (B) are included in a weight ratio therebetween of preferably from 95:5 to 5:95, and more preferably from 70:30 to 30:70. Outside of this range, the durability to repeated impact may dramatically decline.

Next, component (C) of the invention, which is an agent for compatibilizing components A and B, is described. The compatibilizing agent serving as component (C) includes components (C-i), (C-ii) and (C-iii) below.

Component (C-i)

Component (C-i) is two different types of base polymers selected from the series of groups in components (A) and (B). That is, component (C-i) is a base polymer made of a combination of two different types of resin selected from the group consisting of olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers, metal ion neutralization products of olefin-unsaturated carboxylic acid-unsaturated carboxylic acid ester random copolymers, polyethylenes, ethylene-vinyl acetate copolymers and polyesters. Preferred combinations of these base polymers are combinations of a polyethylene with a polyester. It is especially preferable to use a combination of polyethylene terephthalate as the polyester with polyethylene.

Component (C-ii)

Component (C-ii) is a hydrogenated diene polymer having at least one type of functional moiety selected from the group consisting of carboxyl, acid anhydride, (meth)acryloyl, amino, alkoxysilyl, hydroxyl, isocyanate and oxazoline moieties. As used herein, "hydrogenated diene polymer" refers to a polymer in which a conjugated diene polymer serves as the base polymer, functional moieties selected from the foregoing group have been introduced onto this base polymer, and at least 80% of the double bonds on the conjugated diene compound units making up the base polymer are hydrogenated.

Here, "conjugated diene polymer" refers to a polymer containing recurring units from a conjugated diene compound. Illustrative examples include polymers containing recurring units from conjugated diene compounds such as 1,3-butadiene, isoprene, 2,3-dimethyl-1,3-butadiene, 1,3-pentadiene, 2-methyl-1,3-octadiene, 1,3-hexadiene, 1,3-cyclohexadiene, 4,5-diethyl-1,3-octadiene, 3-butyl-1,3-octadiene, myrcene and chloroprene. In this invention, it is especially preferable to have the base polymer be a conjugated diene polymer containing recurring units from 1,3-butadiene or isoprene.

Component (C-iii)

Component (C-iii) is an olefinic polymer having at least one type of functional moiety selected from the group consisting of carboxyl, acid anhydride, epoxy, (meth)acryloyl, amino, alkoxysilyl, hydroxyl, isocyanate and oxazoline moieties. This olefinic polymer is a polymer in which an olefinic polymer serves as the base polymer and functional moieties selected from the foregoing group have been introduced onto this base polymer.

Here, "olefinic polymer" refers to a polymer containing recurring units from an olefinic compound (that is, ethylene and/or an α-olefin). Illustrative examples of α-olefins include α-olefins having from 3 to 12 carbons, such as propylene, 1-butene, 1-pentene, 3-methyl-1-butene, 1-hexene, 3-methyl-1-pentene, 4-methyl-1-pentene, 3-ethyl-1-pentene, 1-octene, 1-decene and 1-undecene. The olefinic polymer may include recurring units from compounds other than olefinic compounds.

The method of introducing functional moieties selected from the foregoing group onto this olefinic polymer is exemplified by the method of copolymerizing the olefinic compound with a monomer containing the functional moiety. For example, a polymer in which carboxyl moieties have been introduced can be obtained by copolymerizing ethylene with (meth)acrylic acid, a polymer in which acid anhydride moieties have been introduced can be obtained by copolymerizing ethylene with maleic anhydride, a polymer in which (meth)acryloyl moieties have been introduced can be obtained by copolymerizing ethylene with a (meth)acryloyl moiety-containing compound, and a polymer in which epoxy moieties have been introduced can be obtained by copolymerizing ethylene with an epoxy moiety-containing compound. The introduction of functional moieties is not limited to copolymerization, and may be carried out by graft polymerization or the like.

Illustrative examples of component (C-iii) include ethylene-(meth)acrylic acid copolymers, ionomers obtained by neutralizing some of the carboxyl moieties on ethylene-(meth)acrylic acid copolymers with sodium, zinc, magnesium or other metallic ions, saponification products of ethylene-(meth)acrylate copolymers, ethylene-(meth)acryloyl copolymers, ethylene-(meth)acrylate-maleic anhydride copolymers, ethylene-vinyl isocyanate copolymers, maleic anhydride-modified polyethylenes, maleic anhydride-modified ethylene-propylene copolymers, ethylene-glycidyl methacrylate copolymers, epoxy-modified ethylene-propylene copolymers, hydroxyl-modified polyethylenes and hydroxyl-modified ethylene-propylene copolymers.

The content of component (C), although not particularly limited, is preferably from 2 to 15 parts by weight, and more preferably from 2 to 7 parts by weight, per 100 parts by weight of the combined amount of components (A) and (B). If this content is too low, components (A) and (B) do not sufficiently compatibilize, as a result of which the durability of the golf ball under repeated impact may markedly decline.

In the golf ball material of the invention, the various types of thermoplastic resins mentioned below may be included in the composition of above components (A) to (C), so long as the advantageous effects of the invention is not detracted. Illustrative examples of thermoplastic resins include, but are not particularly limited to, polyolefin-type elastomers (including polyolefins and metallocene-catalyzed polyolefins), polystyrene-type elastomers, diene-type polymers, polyacrylate-type polymers, polyamide-type elastomers, polyurethane-type elastomers, polyester-type elastomers and polyacetals.

In addition, depending on the intended application, optional additives may be suitably included in the golf ball material of the invention. For example, in cases where the golf ball material of the invention is to be used as a cover stock, various types of additives, such as pigments, dispersants, antioxidants, ultraviolet absorbers and light stabilizers, may be added to above components (A) to (C). When such additives are included, the content thereof per 100 parts by weight of components (A) to (C) combined is preferably at least 0.1 part by weight, and more preferably at least 0.5 part by weight, and is preferably not more than 10 parts by weight, and more preferably not more than 4 parts by weight.

The golf ball material of the invention can be obtained by using any of various types of mixers, such as a kneading type twin-screw extruder, a Banbury mixer, a kneader or a Labo Plastomill, to mix together components (A) to (C). The production extruder may be either a single-screw extruder or a twin-screw extruder, with a twin-screw extruder being more preferred. These extruders may be used in a tandem arrangement, such as single-screw extruder/twin-screw extruder or twin-screw extruder/twin-screw extruder. Such extruders need not be of a special design; the use of an existing extruder will suffice.

In cases where components (A) to (C) are mixed together, use can be made of a method in which these components are charged together into a hopper and extruded under the desired conditions. Alternatively, use can be made of a method in which the respective components are rendered into pellets, and these pellets are charged together into a hopper and dry blended, then extruded under the desired conditions.

Depending on the method of dry blending, the desired effects can be achieved using a compatibilizing agent, without the need for a compounding operation in a mixing apparatus such as a kneading type twin-screw extruder, a Banbury mixer, a kneader or an internal mixer such as a Labo Plastomill. That is, sufficient compatibilization can be achieved by injection-molding (which encompasses also film insert molding) a dry blend of the pellets alone, ultimately enabling sufficient durability of the golf ball material to be obtained.

Aside from use as the material for a one-piece golf ball, the golf ball material of the invention may also be used as a cover-forming material or an intermediate layer-forming material in two-piece solid golf balls composed of a core and a cover encased by the core, and in multi-piece solid golf balls composed of a core of one or more layer, one or more intermediate layer encasing the core, and a cover of one or more layer encasing the intermediate layer. Particularly in the case of golf balls composed of a core of one or more layer and a cover of one or more layer, the core is formed of a rubber composition made up of cis-1,4-polybutadiene, an unsaturated carboxylic acid metal salt, an inorganic filler and an organic peroxide, and the inventive material is preferably used in at least one layer of the cover.

EXAMPLES

The following Examples and Comparative Examples are provided to illustrate the invention, and are not intended by way of limitation.

Examples 1 and 2, Comparative Examples 1 to 5

Solid cores common to each of the Working Examples and the Comparative Examples were obtained using the core-forming composition composed primarily of cis-1,4-polybutadiene shown in Table 1 below.

TABLE 1

| Starting material | Remarks | a |
|---|---|---|
| cis-1,4-Polybutadiene | Synthetic rubber "BR01" from JSR Corporation | 80 |
| cis-1,4-Polybutadiene | Synthetic rubber "BR51" from JSR Corporation | 20 |
| Zinc oxide | Sakai Chemical Co. Ltd. | 10.31 |
| Zinc stearate | NOF Corporation | 5 |
| Mono-, di- or tri(α-methylbenzyl)phenol | Antioxidant "Nocrac SP-N" from Ouchi Shinko Chemical Industry Co., Ltd. | 0.1 |
| Zinc salt of pentachlorothiophenol | | 1 |
| Zinc diacrylate | Nippon Shokubai Co., Ltd. | 31 |
| Dicumyl peroxide | Organic peroxide from NOF Corporation | 0.6 |
| 1,1-(tert-Butylperoxy)-cyclohexane | Organic peroxide from NOF Corporation | 0.6 |

Next, the cover materials formulated as shown in Table 2 below were obtained by stirring together the respective types of pellets using a dry blending method, then injection-molding these cover materials in a temperature range of 160 to 260° C. into molds in which the above solid cores had been placed, thereby producing two-piece solid golf balls having a cover with a thickness of 1.7 mm.

TABLE 2

| Ingredients (pbw) | b | c | d | e | f | g | h |
|---|---|---|---|---|---|---|---|
| Himilan 1601 | 40 | 40 | 40 | 40 | 80 | 80 | 80 |
| Himilan 1557 | 40 | 40 | 40 | 40 | — | — | — |
| Polyethylene J1019 | 20 | 20 | 20 | 20 | — | — | — |
| Hytrel 3046 | — | — | — | — | 20 | 20 | 20 |
| Compatibilizing agent (I) | — | — | 5.26 | — | — | — | 5.26 |
| Compatibilizing agent (II) | — | — | — | 5.26 | — | — | — |
| Compatibilizing agent (III) | 5.26 | — | — | — | 5.26 | — | — |

Details on the materials in Table 2 are given below.

(1) Himilan 1601: A sodium-neutralized ionomer from DuPont-Mitsui Polychemicals Co., Ltd.

(2) Himilan 1557: A zinc-neutralized ionomer from DuPont-Mitsui Polychemicals Co., Ltd.

(3) Polyethylene 31019: A polyethylene from Ube-Maruzen Polyethylene Co., Ltd.

(4) Hytrel 3046: A polyester elastomer from DuPont-Toray Co., Ltd.

(5) Compatibilizing agent (I): A mixture of two types of base polymers of polypropylene (PP) and polylactic acid (PLA), a functional moiety-containing hydrogenated diene polymer and a functional moiety-containing olefinic polymer.

(6) Compatibilizing agent (II): A mixture of two types of base polymers of polypropylene (PP) and polyethylene terephthalate (PET), a functional moiety-containing hydrogenated diene polymer and a functional moiety-containing olefinic polymer.

(7) Compatibilizing agent (III): A mixture of two types of base polymers of polyethylene (PE) and polyethylene terephthalate (PET), a functional moiety-containing hydrogenated diene polymer and a functional moiety-containing olefinic polymer.

The properties of each of the golf balls obtained in the Working Examples and Comparative Examples were evaluated as described below.

Design Corporation (U.S.). This tester functions so as to fire a golf ball pneumatically and cause it to successively strike two metal plates arranged in parallel. The incident velocity against the metal plates was set at 43 m/s. The number of shots required for the golf ball to crack was measured.

TABLE 3

|  |  |  | Example | Comparative Example | | | Example | Comparative Example | |
|---|---|---|---|---|---|---|---|---|---|
|  |  |  | 1 | 1 | 2 | 3 | 2 | 4 | 5 |
| Core | Core composition | type | a | a | a | a | a | a | a |
|  | Diameter (mm) | average | 39.3 | 39.3 | 39.3 | 39.3 | 39.3 | 39.3 | 39.3 |
|  | Weight (g) | average | 36.9 | 36.9 | 36.9 | 36.9 | 36.9 | 36.9 | 36.9 |
|  | Deflection (mm) | average | 3.2 | 3.2 | 3.2 | 3.2 | 3.2 | 3.2 | 3.2 |
|  | Initial velocity (m/s) | average | 78.6 | 78.6 | 78.6 | 78.6 | 78.6 | 78.6 | 78.6 |
| Cover | Composition | type | b | c | d | e | f | g | h |
|  | Thickness (mm) |  | 1.7 | 1.7 | 1.7 | 1.7 | 1.7 | 1.7 | 1.7 |
| Ball product | Diameter (mm) | average | 42.67 | 42.73 | 42.72 | 42.69 | 42.67 | 42.71 | 42.69 |
|  | Weight (g) | average | 45 | 45.11 | 45.18 | 45.09 | 45.25 | 45.4 | 45.36 |
|  | Deflection (mm) | average | 2.49 | 2.52 | 2.51 | 2.52 | 2.57 | 2.58 | 2.6 |
|  | Initial velocity (m/s) | average | 77.41 | 77.46 | 77.28 | 77.29 | 77.46 | 77.41 | 77.45 |
|  | Durability to cracking | average number of shots | 106 | 4 | 8 | 8 | 262 | 2 | 12 |

Core Diameter

The diameter at five random places on the surface of a single core was measured at a temperature of 23.9±1° C., and the average of five measurements was determined. Next, the average measured values thus obtained for five individual cores were used to determine the average core diameter.

Ball Diameter

The diameter at 15 random dimple-free places on the surface of a single ball was measured at a temperature of 23.9±1° C., and the average of these measurements was determined. Next, the average measured values thus obtained for five individual balls were used to determine the average ball diameter.

Deflection of Core and Ball

The object to be measured (core or golf ball) was placed on a steel plate, and the amount of deformation (mm) when compressed under a final load of 1,275 N (130 kgf) from an initial load of 98 N (10 kgf) was measured for each at a temperature of 23.9±1° C.

Initial Velocity

The initial velocities were measured using an initial velocity measuring apparatus of the same type as the USGA drum rotation-type initial velocity instrument approved by the R&A. The balls to be tested were held isothermally in a 23.9±1° C. environment for at least 3 hours, then tested in a chamber at a room temperature of 23.9±2° C. Each ball was hit using a 250-pound (113.4 kg) head (striking mass) at an impact velocity of 143.8 ft/s (43.83 m/s). One dozen balls were each hit four times and the time taken for the ball to traverse a distance of 6.28 ft (1.91 m) was measured and used to compute the initial velocity (m/s). This cycle was carried out over a period of about 15 minutes.

Durability to Cracking

The durability of the golf ball was evaluated using an ADC Ball COR Durability Tester produced by Automated It is apparent from the results in Table 3 that, in ionomer/polyethylene cover compositions, the balls obtained in Example 1 in which compatibilizing agent (III) was added to the composition, had a better durability to cracking than the balls obtained in Comparative Example 1 in which compatibilizing agent was not added, the balls obtained in Comparative Example 2 in which compatibilizing agent (I) was added, and the balls obtained Comparative Example 3 in which compatibilizing agent (II) was added.

It is also apparent that, in ionomer/polyester elastomer cover compositions, the balls obtained in Example 2 in which compatibilizing agent (III) was added to the composition, had a better durability to cracking than the balls obtained in Comparative Example 4 in which no compatibilizing agent was added, and the balls obtained in Comparative Example 5 in which compatibilizing agent (I) was added.

Japanese Patent Application No. 2014-129071 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:
1. A golf ball material comprising
(A) one, two or more resin ingredients selected from the group consisting of olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers and metal ion neutralization products of olefin-unsaturated carboxylic acid-unsaturated carboxylic acid ester random copolymers;

(B) one, two or more resin ingredients selected from the group consisting of polyethylenes, ethylene-vinyl acetate copolymers polyester elastomers, polyethylene terephthalate, polytrimethylene terephthalate, polybutylene terephthalate, polyethylene naphthalate and polybutylene naphthalate; and (C) an agent for compatibilizing components (A) and (B), wherein the compatibilizing agent (C) comprises:

(C-i) a base polymer made from a combination of two different types of resin, wherein one of the two different types of resin is polyethylene and one of the two different types of resin is a polyester selected from the group consisting of polyester elastomers, polyethylene terephthalate, polytrimethylene terephthalate, polybutylene terephthalate, polyethylene naphthalate and polybutylene naphthalate, (C-ii) a hydrogenated diene polymer having at least one type of functional moiety selected from the group consisting of carboxyl, acid anhydride, (meth)acryloyl, amino, alkoxysilyl, hydroxyl, isocyanate and oxazoline moieties, and (C-iii) an olefinic polymer having at least one type of functional moiety selected from the group consisting of carboxyl, acid anhydride, epoxy, (meth)acryloyl, amino, alkoxysilyl, hydroxyl, isocyanate and oxazoline moieties.

2. The golf ball material according to claim 1, wherein components (A) and (B) are included in a weight ratio therebetween of from 95:5 to 5:95.

3. The golf ball material according to claim 1, wherein the content of component (C) is from 2 to 15 parts by weight per 100 parts by weight of the combined amount of components (A) and (B).

4. The golf ball material according to claim 1, wherein the polyester in component (C-i) is polyethylene terephthalate.

5. A golf ball comprising a core of one or more layer and a cover of one or more layer, wherein at least one member of the core or the cover or both is made of the golf ball material of claim 1.

* * * * *